No. 684,021. Patented Oct. 8, 1901.
W. W. WHITCOMB.
CLUTCH OR BRAKE SHOE.
(Application filed Feb. 16, 1901.)
(No Model.)
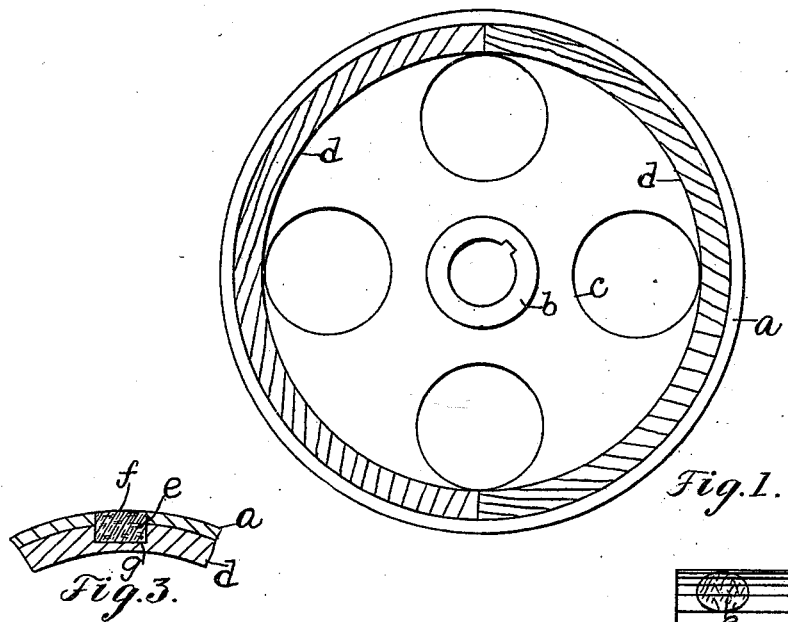
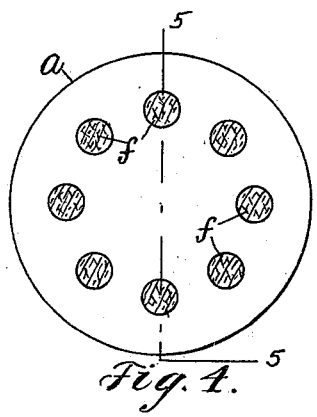
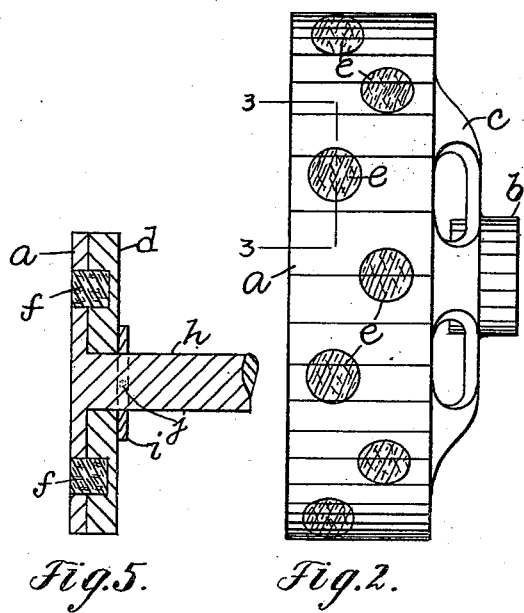
Witnesses.
C. H. Gannett,
J. Murphy
Inventor:
William W. Whitcomb
by Jas. H. Churchill
Atty.
THE NORRIS PETERS CO., PHOTO-LITHO., WASHINGTON, D. C.

UNITED STATES PATENT OFFICE.

WILLIAM W. WHITCOMB, OF BROOKLINE, MASSACHUSETTS.

CLUTCH OR BRAKE-SHOE.

SPECIFICATION forming part of Letters Patent No. 684,021, dated October 8, 1901.

Application filed February 16, 1901. Serial No. 47,625. (No model.)

*To all whom it may concern:*

Be it known that I, WILLIAM W. WHITCOMB, a citizen of the United States, residing in Brookline, in the county of Norfolk and State of Massachusetts, have invented an Improvement in Clutches or Brake-Shoes, of which the following description, in connection with the accompanying drawings, is a specification, like letters on the drawings representing like parts.

This invention relates to a clutch or brake-shoe of that class in which the whole or a portion of the wearing-surface is composed of a softer material than the body portion of the clutch or shoe.

The invention has for its object to provide a clutch or brake-shoe of the class described in which the weight of the same may be materially reduced without diminishing the wearing life of the clutch or shoe, whereby the said clutch or shoe may be used in places and on machines where lightness, coupled with efficiency, is desired. For this purpose the metal body portion is made substantially thin, but of sufficient thickness to obtain the desired strength and wear, and is reinforced by a backing of lighter material, which may be wood, and the softer material is inserted into a socket or sockets extended through the metal body portion and into the said backing, whereby the inserts of softer material may be retained in position irrespective of the amount the metal body portion is worn. I may prefer to make the inserts of cork and the reinforcing-backing of wood; but I do not desire to limit my invention in this respect, as other materials may be used. To facilitate description, I will hereinafter refer to the inserts as made of cork and the backing as made of wood. These and other features of this invention will be pointed out in the claims at the end of this specification.

Figure 1 is an elevation of one form of clutch or brake-shoe embodying this invention; Fig. 2, a side elevation of the clutch or brake-shoe shown in Fig. 1 looking toward the left; Fig. 3, a sectional detail on the line 3 3, Fig. 2; Fig. 4, an elevation of a modification to be referred to; and Fig. 5, a section on the line 5 5, Fig. 4.

Referring to Figs. 1 to 3, $a$ represents the metal body portion of the clutch or shoe, which is shown as the rim of a pulley or wheel provided with a hub $b$, connected to the said rim by an offset plate or web $c$. The rim $a$ is reinforced on its inner side with a backing $d$, of wood, represented as made in two parts, which may be fitted tight within the rim or which may, if desired, be suitably fastened to the said rim. The metal body portion or rim $a$ is provided, preferably, with a plurality of openings $e$ for the reception of inserts $f$, of cork, which are made longer than the thickness of the rim and which are extended through the openings $e$ and into holes, openings, or sockets $g$ made in the wooden backing in line with the openings $e$ in the metal body or rim $a$.

The clutch or brake-shoe shown in Figs. 1 and 2 is applicable, among other uses, to be applied to automobiles, and in practice the said shoe has coöperating with it a band or strap (not shown) which is adapted to be applied to the rim of the shoe when it is desired to stop the vehicle.

In Figs. 4 and 5 I have shown my invention as embodied in another form, in which the metal body portion $a$ is shown as a disk or plate and the wooden backing $d$ as a disk or plate mounted on the shaft $h$, attached to the disk $a$. The wooden backing $d$ is suitably secured to the disk $a$ and, as shown, is secured thereto by a washer or ring $i$, fastened on the shaft $h$ by a pin $j$. The cork inserts $f$ extend through the metal disk $a$ into the sockets in the backing $d$.

From the above description it will be seen that the inserts may be firmly secured to the reinforcing-backing, and consequently the metal body portion may be materially reduced in thickness, which is desirable in many cases—as, for instance, when used on automobiles or machines—and that this reduction in thickness does not detract from the life or efficiency of the clutch or brake-shoe, as the inserts will last as long as the metal body portion, which may be worn very thin and, in fact, practically used up without danger of the inserts dropping out or otherwise becoming detached from the clutch or shoe.

As above stated, I may prefer to make the inserts of cork and when so made to insert them into their sockets in a compressed state, thereby depending on the expansion of the cork to retain the inserts in their sockets.

I claim—

1. As an improved article of manufacture, a composite clutch or brake-shoe consisting of a metal body portion provided with a hole or opening through it, a backing for said body portion of lighter material than said body portion and provided with a socket or opening in line with the opening in the metal body portion, and an insert of softer material extended through the hole in the metal body portion into the hole or socket in the backing, substantially as and for the purpose specified.

2. As an improved article of manufacture, a composite clutch or brake-shoe consisting of a metal body portion provided with a plurality of openings through it, a backing for said body portion of lighter material than said body portion and provided with a plurality of openings in line with the openings in said body portion, and a plurality of cork inserts extended through the openings in the body portion and into the openings in the said backing, substantially as and for the purpose specified.

3. As an improved article of manufacture, a composite clutch or brake-shoe consisting of a metal body portion provided with a plurality of openings through it, a backing of non-metallic material for said body portion provided with a plurality of openings in line with the openings in said body portion, and a plurality of cork inserts extended through the openings in the body portion and into the openings in the non-metallic backing, substantially as and for the purpose specified.

In testimony whereof I have signed my name to this specification in the presence of two subscribing witnesses.

WILLIAM W. WHITCOMB.

Witnesses:
JAS. H. CHURCHILL,
J. MURPHY.